(12) United States Patent
Schiødt

(10) Patent No.: US 8,119,099 B2
(45) Date of Patent: Feb. 21, 2012

(54) CHROMIUM-FREE WATER GAS SHIFT CATALYST

(75) Inventor: Niels Christian Schiødt, Brønshøj (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 12/957,496

(22) Filed: Dec. 1, 2010

(65) Prior Publication Data
US 2011/0101277 A1    May 5, 2011

Related U.S. Application Data

(62) Division of application No. 12/483,043, filed on Jun. 11, 2009, now Pat. No. 7,998,897.

(30) Foreign Application Priority Data

Jul. 3, 2008 (DK) ................................ 2008 00934

(51) Int. Cl.
*C01B 3/16* (2006.01)
(52) U.S. Cl. ..................... 423/656; 423/418.2; 423/655; 252/373
(58) Field of Classification Search ............... 423/418.2, 423/648, 655, 656; 252/373
See application file for complete search history.

(56) References Cited

U.S. PATENT DOCUMENTS 3,626,021 A * 12/1971 Michaels et al. .............. 585/663
4,104,318 A *  8/1978 Hupp et al. .................... 585/319
4,564,643 A    1/1986 Shibata et al.

FOREIGN PATENT DOCUMENTS

| FR | 2 794 768     | 12/2000 |
| GB | 2 118 061 A   | 10/1983 |
| GB | 2 158 730 A   | 11/1985 |
| JP | 10-180101     | 7/1998  |
| JP | 2004-321924 A | 11/2004 |

OTHER PUBLICATIONS

Q. Liu et al., "Reaction and Characterization Studies of an Industrial Cr-Free Iron-Based Catalyst for High-Temperature Water Gas Shift Reaction", *Catalysis Today*, vol. 106 (2005), p. 52-56.
S. Natesakhawat et al.,"Development of chromium-free iron-based catalysts for high-temperature water-gas shift reaction", *Journal of Molecular Catalysis A: Chemical*, vol. 260 (2006), p. 82-94.

* cited by examiner

*Primary Examiner* — Elizabeth Wood
(74) *Attorney, Agent, or Firm* — Dickstein Shapiro LLP

(57) ABSTRACT

Catalyst for use in the high temperature shift reaction comprising in its active form a mixture of zinc alumina spinel and zinc oxide in combination with an alkali metal selected from the group consisting of Na, K, Rb, Cs and mixtures thereof.

3 Claims, No Drawings

CHROMIUM-FREE WATER GAS SHIFT CATALYST

This application is a divisional of application Ser. No. 12/483,043, filed Jun. 11, 2009 now U.S. Pat. No. 7,998,897, which is hereby incorporated by reference in its entirety.

The present invention relates to an improved water gas shift catalyst. In particular the invention relates to a chromium-free high temperature shift (HTS) catalyst and process for its use.

Hydrogen production from natural gas, oil, coal, coke, naphta and other carbonaceous resources is typically carried out via steam reforming, autothermal reforming or gasification reactions. In any of these reactions a stream of synthesis gas (syngas) is produced. The syngas contains hydrogen, carbon monoxide, carbon dioxide and water as the major components. In order to maximize the hydrogen yield it is customary to convert the synthesis gas further by means of the water gas shift reaction $CO + H_2O \rightleftharpoons CO_2 + H_2$.

In order for this reaction to proceed at a feasible rate the syngas is converted over a suitable catalyst in a reactor. The water gas shift reaction is an equilibrium limited, exothermic reaction. The hydrogen yield can therefore be optimized by carrying out the reaction in two separate adiabatic reactors with inter-stage cooling. The first of these reactors is commonly designated as a high-temperature shift (HTS) reactor, containing a high-temperature shift catalyst, and the second as a low-temperature shift (LTS) reactor containing a low-temperature shift catalyst. Some industrial plants are designed with a high-temperature shift reactor only. In some plants carbon monoxide is the desired component. A synthesis gas mixture may be enriched in carbon monoxide by means of the water gas shift reaction, in this case sometimes called the reverse water gas shift reaction. Whether a given synthesis gas mixture will be shifted towards being enriched in hydrogen or in carbon monoxide depends on the temperature and composition of the gas.

In low temperature shift operations Cu/Zn/Al catalysts are normally used with inlet temperatures to the LTS-reactor normally close to 200° C. or 20° C. above the dew point of the gas. The outlet temperature from the LTS-reactor is often in the range 220° C. to 250° C.

In high temperature shift operations current industrial practice relies on the use of high-temperature shift catalyst consisting of iron (Fe), chromium (Cr) and copper (Cu) mainly in the form of oxides. This catalyst operates in the range 300° C. to 500° C. with the lower limit corresponding to the inlet temperature to the HTS-reactor and the upper limit corresponding to the outlet temperature. Typical operating pressures are in the range 2.3 to 6.5 MPa. Although this catalyst system has been used for decades, it suffers from some major drawbacks.

One drawback is the presence of chromium in the catalyst which makes it an environmental and health hazard to handle. This is particularly so because chromium (VI) oxide, $CrO_3$, and related compounds of chromium in oxidation state VI are easily formed by oxidation of the catalyst. All handling of the catalyst during manufacture, transport, loading and unloading is therefore a potential hazard.

Another drawback is that a certain surplus of water vapor compared to carbon monoxide is needed to prevent overly reduction of the catalyst. Thus, if the steam-to-carbon molar ratio (S/C ratio) in the synthesis gas upfront the high-temperature shift reactor is too low, or equivalently if the steam-to-dry gas molar ratio (S/G ratio) upstream the high-temperature shift reactor is too low, or equivalently if the oxygen/carbon molar ratio (O/C ratio) is too low, formation of iron carbides and/or elemental iron in the HTS-catalyst will be promoted. Such overly reduction causes severe loss of mechanical strength of the catalyst as well as excessive methane formation with attendant decrease in hydrogen production. The particular surplus of water vapor needed is determined by the specific operating conditions and the gas composition. The surplus of water is an additional cost to the industrial plant since energy is spent on its evaporation and heating. In other words, significant energy savings would be obtained by operating with low S/C ratios in units upstream the HTS-reactor, particularly steam reforming units and consequently also with low S/C ratios at the inlet of the HTS-reactor. A low S/C ratio at the inlet of the HTS-reactor manifests itself into a low O/C and S/G ratio.

Yet another drawback is the sensitivity to poisons. It is well known that compounds of elements such as chlorine, sulfur, alkali metals, silicon and others have a negative impact on the activity and/or the selectivity of the iron-based HTS-catalyst. Previous attempts of developing a chromium-free HTS catalyst have seemingly been focused on iron-based catalysts, e.g. promoted by aluminum and cerium [Q. Liu, W. Ma, R. He and Z. Mu, *Catalysis Today* 2005, 52-56] or by aluminum and copper [S, Natesakhawat, X. Wang, L. Zhang and U. S. Ozkan, *J. Mol. Catal. A: Chemical* 2006, 82-94]. It is foreseeable that these catalysts will still suffer from some of the above mentioned disadvantages.

It would be desirable to be able to provide a HTS-catalyst which overcomes the above mentioned drawbacks by being free of hazardous elements, particularly chromium, being operable at low steam-to-carbon ratios to the HTS-reactor as well as being more tolerant to the presence of poisons.

JP patent application No. 2004-321924 (JP 2004321924A) describes a copper-alkali metal catalyst for the water gas shift reaction supported on zinc-aluminum oxides. Copper is the active catalyst, while the zinc-aluminum oxide acts only as the carrier. The catalyst was tested at 400° C. and atmospheric pressure corresponding probably to conditions in the automotive industry and well outside the industrial HTS operating ranges of 2.3-6.5 MPa. Copper is considered a crucial part of the catalyst system and a content of copper of 2-20% is required. Since copper is the most expensive component of the catalyst, it contributes significantly to the production cost of the catalyst.

It is an object of the present invention to provide a HTS-catalyst which is free of chromium, thus being more environmentally friendly and safer to handle than the existing Cu/Cr/Fe catalysts.

It is another object of the invention to provide a HTS-catalyst which enables operation at low O/C ratio in the gas over the HTS-reactor equivalently at low S/C ratio, or equivalently at low S/G ratio (steam-to-dry gas molar ratio) at the inlet of the HTS-reactor without causing excessive methane formation and without causing excessive pressure drop over the reactor.

It is a further object of the present invention to provide a HTS catalyst, which has a high thermal stability, i.e. which maintains its activity for prolonged periods of operation.

It is a further object of the present invention to provide a HTS catalyst, which has high tolerance towards impurities in the gas phase containing sulfur and chlorine.

It is a further object of the invention to provide a more inexpensive catalyst than prior art catalysts.

These and other objects are solved by the invention.

Accordingly, in a first aspect of the invention we provide a catalyst for use in the high temperature shift reaction consisting in its active form of a mixture of zinc alumina spinel and zinc oxide in combination with an alkali metal selected from the group consisting of Na, K, Rb, Cs and mixtures thereof, said catalyst having a Zn/Al molar ratio in the range 0.5 to 1.0 and a content of alkali metal in the range 0.4 to 8.0 wt % based on the weight of oxidized catalyst.

As used herein the term "in its active form" refers to the phases of the catalyst during operation. Thus, a mixture of one mole of ZnO and one mole of $Al_2O_3$ will at least partially transform to $ZnAl_2O_4$ during operation. A catalyst consisting of zinc in the form of zinc oxide, aluminum in the form of aluminum oxide and alkali metal compounds is therefore active according to the invention since zinc oxide and aluminum oxide will react to form zinc aluminum spinel during operation.

As used herein the term "based on the weight of oxidized catalyst" means a given amount of a component by weight relative to the catalyst in its oxidized form. For instance, when it is stated that a catalyst contains 1.75 wt % potassium this means 1.75 grams of elemental potassium per 100 grams of oxidized catalyst.

The catalysts of the invention enable the composition of the synthesis gas mixture to approach the equilibrium composition. They are characterized by being comprised by a mixture of zinc oxide and zinc alumina spinel in combination with an alkali metal promoter. It has long been known that ZnO alone has a low activity for the water gas shift reaction. Supported alkali metal compounds, for instance alkali supported on alumina, show also low activity for the water gas shift reaction. Yet by the invention an unexpected effect is obtained when combining these since activity is kept high at prolonged times without requiring copper in the composition. Zinc alumina spinel, $ZnAl_2O_4$, is formed by the reaction $ZnO+Al_2O_3=ZnAl_2O_4$. Zinc spinel has been suggested as catalyst for the reverse water gas shift reaction. However, the catalytic activity of either of $ZnAl_2O_4$ and $K_2CO_3/Al_2O_3$ is much lower than that of a Cu—Fe—Cr catalyst, which is the state of the art high-temperature water gas shift catalyst.

We have also unexpectedly found that compounds of the alkali metals except lithium when supported on $ZnAl_2O_4$ in combination with ZnO have under some conditions even higher HTS activity than that of a Cu—Cr—Fe catalyst. This is direct contrast to related catalysts such as potassium promoted $MgO/MgAl_2O_4$, which show almost no activity for the water gas shift reaction. It is furthermore surprising that K and Cs are significantly stronger promoters than Na and also that Li has seemingly no promoting effect.

We have found that at the high temperatures and pressures typical for the operation of a HTS-reactor the presence of copper is insignificant and that the activity of those catalysts containing copper and those catalysts that are free of copper closely resemble each other, particularly at long operation times such as 500 hr or longer. This is highly attractive, because HTS-catalysts should be able to operate under stable conditions (without significant activity loss) for years. Since copper is a relatively expensive raw material compared to zinc and aluminum the omission of copper enables the production of a cheaper catalyst. Reasons for copper not contributing to the activity seem to be the fast sintering of the copper particles at the high temperatures of the HTS process (300-500° C.) and the high sensitivity of Cu towards poisons such as sulfur and chlorine. Accordingly, the omission of copper in the catalysts of the invention results in catalysts which are tolerant towards these poisons and yet are active in the HTS reaction at prolonged times. More specifically we have found that the catalyst after have taken up sulfur during operation could at prolonged times, for instance after 500 hr of operation or more (time-on-stream, TOS), at least restore the original activity of the sulfur free catalyst.

The catalysts of the present invention are free of chromium, iron and copper. They contain only relatively harmless compounds, namely zinc oxide, aluminum oxide, zinc aluminum spinel and alkali metal compounds preferably in the form of alkali metal carbonates. The catalysts of the present invention are therefore safer to handle and more environmentally benign than current industrial HTS catalysts.

The catalysts of the present invention are highly stable, i.e. their activity is maintained at prolonged operating times. Furthermore, they are capable of operating at low S/C ratios and thereby low S/G ratios at the HTS-reactor inlet without forming excessive amounts of methane and other hydrocarbons and they enable the composition of the synthesis gas mixture to approach the equilibrium composition.

In the general embodiment of the invention the catalyst in its active form is comprised by the elements zinc, aluminum and at least one of the alkali metals selected from Na, K, Rb, Cs and mixtures thereof said elements being in the form of oxides and/or carbonates and/or bicarbonates in various degrees of hydration, the composition of the catalyst being defined by the molar ratio between zinc and aluminum (Zn/Al) being between 0.5 and 1.0 and forming a mixture of zinc alumina spinel and zinc oxide, and the alkali metal promoter being present in amounts from 0.4-8.0% by weight relative to the catalyst in its oxidized form.

The Zn/Al molar ratio is preferably in the range 0.5 to 0.8, more preferably in the range 0.60 to 0.70.

The amount of Al is preferably 20 wt % to 30 wt % based on the weight of oxidized catalyst, for instance 21, 22, 23, 24, 25 wt %.

The amount of Zn is preferably 30 wt % to 40 wt % based on the weight of oxidized catalyst for instance 32, 34, 35, 36, 38 wt %.

The amount of alkali metal promoter is for instance 0.5, 0.6, 0.8, 0.9, 1.3, 1.5, 1.7, 1.8, 2.0, 2.5, 2.7, 3.0, 3.2, 3.5, 3.7, 4.0, 5.0, 6.0, 7.2, 7.5 wt %. Preferably, the alkali metal promoter is potassium and is present in an amount of 1-3 wt % based on the weight of oxidized catalyst. In yet another embodiment the alkali metal is cesium and is present in an amount of 5 wt % to 10 wt %. We have found that at these concentrations of potassium or cesium in the catalyst, a surprisingly high activity in terms of reaction rate (Rate) is obtained. The reaction rate is simply defined as the amount of carbon monoxide consumed by the shift reaction per unit time divided by the catalyst mass.

More particularly, the preferred catalyst is a catalyst having a Zn/Al molar ratio of 0.65-0.70, preferably 0.7, and the catalyst further contains 31-34 wt % Zn, preferably 33 wt % Zn, and 2.7-3.0 wt % K, preferably 2.8 wt % K, based on the weight of oxidized catalyst. The Al content is implicitly given by the Zn/Al molar ratio and Zn content of the catalyst. Catalyst within this range of composition shows an unexpected high activity in terms of Rate. Higher or lower potassium concentrations result in a decrease of reaction rate.

Another preferred catalyst has a Zn/Al molar ratio of about 0.7, and the catalyst further contains 34-36 wt % Zn, preferably 35 or 35.5 wt % Zn, and 7-8 wt % Cs, preferably 7.2 wt % Cs, based on the weight of oxidized catalyst. The Al content is implicitly given by the Zn/Al molar ratio and Zn content of the catalyst. This catalyst also shows an unexpected high activity.

The catalysts of the invention may be used for high temperature water gas shift in order to enrich the gas in hydrogen (to increase the content of hydrogen in the gas) and also in the reverse water gas shift to enrich the gas in carbon monoxide. Accordingly, the invention encompasses also a process for enriching a synthesis gas mixture in hydrogen by contacting said synthesis gas mixture with a catalyst according to the invention as set forth in claim 1. The invention encompasses also a process for enriching a synthesis gas mixture in carbon monoxide by contacting said synthesis gas mixture with a catalyst according to the invention as set forth in claim 2.

The process conditions are such that the pressure in the HTS-reactor is in the range 2.3 to 6.5 MPa, preferably 2.5-4.5 MPa, while the inlet temperature of the synthesis gas mixture to the reactor is in the range 300° C. to 400° C., preferably 330° C., and the outlet temperature 420° C. to 520° C., preferably 450° C. The steam-to-dry gas molar ratio (S/G ratio) to the HTS-reactor is preferably in the range 0.05 to 0.9, more preferably 0.1 to 0.9. The S/G ratio is simply defined as the molar ratio of water with respect to the rest of the synthesis gas entering the HTS-reactor, i.e. on a dry basis. The synthesis gas entering the HTS-reactor contains normally 5-50 vol % CO, 5-50 vol % $CO_2$, 20-60 vol % $H_2$, 15-50 vol % $H_2O$, 0-30 vol % $N_2$; for instance 9 vol % CO, 7 vol % $CO_2$, 25 vol % $H_2$, 33 vol % $H_2O$, 27 vol % $N_2$.

In a preferred embodiment the synthesis gas mixture has S/G ratio of 0.05 to 0.9, a temperature of 300° C. to 400° C. and the reactor operates at a pressure in the range 2.3 to 6.5 MPa.

The process of the invention is stable at prolonged times, e.g. for more than 500 hr due to the high stability of the catalyst. Hence, inexpedient shutdowns during the catalyst lifetime are avoided or at least significantly reduced. The process is more tolerant to the presence of sulfur in the synthesis gas being treated. Stringent environmental demands are met because chromium is not needed in the catalyst, and at the same time there is no risk of excessive methane or hydrocarbon formation, particularly at low S/C ratios in reforming units upstream and thereby at low O/C ratios in the synthesis gas to the shift reactor. Because of operation at low O/C ratios or equivalently low S/C ratios significant energy savings are achieved. This becomes particularly important in ammonia plants, which normally operate with high S/C ratios in the synthesis gas reforming section of the plant for instance at S/C ratio of 2.50 or 2.75. By the invention it is now possible to reduce the S/C ratio in the reforming section down to 1.8 or even much lower, thereby increasing the energy efficiency of the ammonia plant as well as reducing the size of plant equipment significantly.

EXAMPLES

Catalyst preparation. The catalysts of the present invention may be prepared in a number of ways including coprecipitation of salts of zinc and aluminum with a base such as ammonia, alkali metal hydroxides and alkali metal carbonates and bicarbonates. Suitable zinc and aluminum salts are the nitrates, sulfates, acetates, halides and mixtures of these. Alternatively, a solution of a zinc(II) salt such as zinc nitrate may be precipitated with an alkali metal aluminate in solution as described in Example 1. Another alternative preparation method consists of co-precipitation of salts of zinc and aluminum with organic amines. Another alternative preparation method consists of co-precipitation of salts of zinc and aluminum by hydrolysis of urea. The promoters are conveniently impregnated onto the catalyst as solutions of appropriate alkali metal compounds. Preferred compounds are alkali metal carbonates, bicarbonates, nitrates, carboxylates and hydroxides. Catalyst preparation is in any case concluded by calcination at a temperature in the range 200-800° C., preferably in the range 450-650° C.

In the following Examples, the catalysts A-I are catalysts of the present invention while catalysts C1-C12 are comparative catalysts. All catalyst formulations are listed in Table 1, while Tables 2-7 lists results from activity tests.

Example 1

Preparation of Catalyst A

A solution of zinc nitrate hexahydrate was prepared by dissolving 208.3 g of Zn $(NO_3)_2 * 6H_2O$ in deionized water and adjust the volume to 600 $cm^3$. 254.5 g of a solution of $KAlO_2$ containing excess KOH (10.6% Al, 22.9% K, density=1.57 $g/cm^3$) was diluted with deionized water to a total volume of 600 $cm^3$. The two solutions were mixed together causing a precipitate to form. The stirred suspension was heated to 95° C. for one hour after which pH was adjusted to 8 by adding 10% nitric acid. The precipitate was filtered, washed several times with hot, deionized water and dried at 100° C. The dried intermediate was calcined at 500° C. for two hours. The resulting powder was characterized by XRD showing a mixture of zinc-alumina spinel ($ZnAl_2O_4$) and ZnO. The powder was impregnated with a solution of $K_2CO_3$ in water by the incipient wetness technique and dried at 100° C. Elemental analysis was done by the ICP method and showed the catalyst to contain 38.6% Zn, 22.9% Al and 1.76% K. The molar Zn/Al ratio was thus 0.70. The powder was mixed with graphite (4% wt/wt) and pelletized to give cylindrical tablets, 6 mm diameter by 4 mm height, density 1.80 $g/cm^3$. Finally, the pellets were calcined two hours at 550° C.

Example 2

Preparation of Catalyst B

This catalyst was prepared from Zn $(NO_3)_2 * 6H_2O$ (297.9 g) and $KAlO_2$/KOH (448 g) as in Example 1 but in the presence of potassium carbonate. $K_2CO_3$ (59.4 g) was dissolved in the $KAlO_2$/KOH solution before admixture with the zinc nitrate solution. The resulting precipitate was treated as in Example 1. The presence of carbonate ions during precipitation resulted in the formation of a hydrotalcite phase as identified by XRD analysis of the dried powder. After calcination XRD showed a mixture of $ZnAl_2O_4$ and ZnO. All catalysts were analyzed by the ICP-MS method and the compositions of the catalysts on a weight basis including comparative catalysts are listed in Table 1. Elements detected in concentrations of less than 300 ppm are not listed. The columns Zn/Al and Mg/Al, respectively, refer to the molar ratio of the specified elements.

TABLE 1

| | Catalyst compositions | | | | | | | | | | | |
|---|---|---|---|---|---|---|---|---|---|---|---|---|
| | % Li | % Na | % K | % Cs | % Cu | % Cr | % Fe | % Mg | % 1Zn | % Al | Zn/Al | Mg/Al |
| A | — | — | 1.76 | — | — | — | — | — | 38.6 | 22.9 | 0.70 | — |
| B | — | — | 0.88 | — | — | — | — | — | 38.6 | 22.9 | 0.70 | — |

TABLE 1-continued

Catalyst compositions

| | % Li | % Na | % K | % Cs | % Cu | % Cr | % Fe | % Mg | % Zn | % Al | Zn/Al | Mg/Al |
|---|---|---|---|---|---|---|---|---|---|---|---|---|
| C   | —    | —    | 3.95 | —   | —    | —   | —    | —   | 36.3 | 21.5 | 0.70 | —    |
| D   | —    | —    | 2.77 | —   | —    | —   | —    | —   | 32.7 | 20.0 | 0.67 | —    |
| E   | —    | 1.02 | —    | —   | —    | —   | —    | —   | 33.0 | 22.8 | 0.60 | —    |
| F   | —    | —    | 1.06 | —   | —    | —   | —    | —   | 35.8 | 21.4 | 0.69 | —    |
| G   | —    | —    | 1.17 | —   | —    | —   | —    | —   | 34.4 | 24.0 | 0.59 | —    |
| H   | —    | —    | —    | 7.2 | —    | —   | —    | —   | 35.5 | 21.0 | 0.70 | —    |
| I   | —    | —    | 1.19 | —   | —    | —   | —    | —   | 32.3 | 24.5 | 0.58 | —    |
| C1  | —    | —    | —    | —   | —    | —   | —    | —   | 33.3 | 24.1 | 0.57 | —    |
| C2  | —    | —    | 5.34 | —   | —    | —   | —    | —   | —    | NM*  | —    | —    |
| C3  | —    | —    | —    | —   | 1.50 | 6.0 | 63.5 | —   | —    | —    | —    | —    |
| C4  | 0.20 | —    | —    | —   | —    | —   | —    | —   | 37.9 | 22.5 | 0.70 | —    |
| C5  | 0.85 | —    | —    | —   | —    | —   | —    | —   | 35.8 | 21.2 | 0.70 | —    |
| C6  | —    | —    | —    | —   | —    | —   | —    | —   | 32.8 | 26.2 | 0.52 | —    |
| C7  | —    | —    | —    | —   | —    | —   | —    | —   | 38.6 | 22.9 | 0.70 | —    |
| C8  | —    | —    | 1.73 | —   | 1.83 | —   | —    | —   | 32.3 | 23.3 | 0.57 | —    |
| C9  | —    | —    | —    | —   | —    | —   | —    | 15.0 | —   | 32.3 | —    | 0.52 |
| C10 | —    | —    | 1.51 | —   | —    | —   | —    | 14.0 | —   | 30.7 | —    | 0.51 |
| C11 | —    | —    | —    | —   | —    | —   | —    | 18.5 | —   | 29.9 | —    | 0.69 |
| C12 | —    | —    | 1.55 | —   | —    | —   | —    | 17.8 | —   | 28.3 | —    | 0.70 |

*NM: Not Measured

Catalyst Testing

Catalysts of the present invention together with some comparative catalysts were tested in different plug-flow reactors at varying conditions. The general method was as follows:

In most cases the catalyst was shaped as cylindrical pellets with diameter between D=4.5 mm and D=6.0 mm. In these cases the catalyst, in the amount $M_{cat}$ (gram), was loaded into a copper-lined tubular reactor with ID=7 mm in such way that the pellets were separated from each other by a 5 mm diameter sphere of dead-burned alumina. In some cases the catalyst was loaded as granules in the sieved fraction of 0.15-0.30 mm in which case the inner diameter of the reactor was 4 mm and the catalyst was loaded undiluted. The reactor was heated by an external heating device to the reaction temperature which in most cases was T=380° C. or T=391° C. measured in the gas phase immediately downstream the catalyst bed. The temperature was kept constant within ±3° C. The reactor was pressurized to the reaction pressure most often P=2.3 MPa or P=2.5 MPa in synthesis gas. Syngas, dosed by a Bruckner mass flow controller, and steam, dosed by a Knauer pump, were preheated and mixed before passing over the catalyst. The total flow was in most cases F=75 Nl/h or F=84 Nl/h. The Gas Hourly Space Velocity (GHSV) expressed as the space-mass velocity, F/Mcat was calculated from the flow and the loaded weight of catalyst. In most cases the space velocity was in the range of 16-26 or 50-70 Nl/g/h. The gas composition was typically 9.7 vol % CO, 6.5 vol % $CO_2$, 37.1 vol % $H_2O$, 44.8 vol % $H_2$ and 1.9 vol % Ar corresponding to a steam/dry gas molar ratio (S/G) of 0.59. The Ar was used as an internal standard. In some cases a S/G ratio was chosen resulting in a gas composition close to 10.2 vol % CO, 6.8 vol % $CO_2$, 33.8 vol % $H_2O$, 47.2 vol % $H_2$ and 2.0 vol % Ar where S/G=0.51. The concentration of all components was regularly measured in both inlet and dry exit gas by means of a Hewlett Packard Gas Chromatograph which had been calibrated towards a gas mixture of known composition. Mass balances were recorded for C, H and O and found to be within 1.00±0.03 in all cases.

The activities of a number of catalysts of the present invention together with some comparative catalysts are listed in Tables 2-7. In all cases the activity was measured after at least 60 hours at the specified temperature after which the activity was stable. In Examples 3-10 (Table 2) the catalysts were subject to a forced ageing procedure where, after the first 24 hours at 380° C., the temperature was raised to 480° C. and kept there for 17 hours. Measurements were then resumed at 380° C.

Data on the catalyst dimensions, catalyst loading, total flow (F), CO-concentration inlet the reactor [CO], measured percent CO-conversion (C %), calculated percent equilibrium CO-conversion ($C_{eq}$ %) and Rate in mole/kg/hour are recorded in Table 2. The selectivity to the water gas shift reaction was 100% within experimental uncertainty since the amount of converted CO was balanced by the excess $CO_2$ relative to the inlet gas. These examples demonstrate that a catalyst with a composition, which is representative for the catalysts of the present invention is particularly active for the high temperature water gas shift reaction.

TABLE 2

Activities of catalysts of the invention and of some comparative catalysts. P = 2.3 MPa, T = 380° C., S/G = 0.59

| Ex. | Cat | [K] % | Zn/Al | D Mm | H Mm | d g* $cm^{-3}$ | $M_{cat}$ g | F Nl* $h^{-1}$ | GHSV Nl* $g^{-1}$ * $h^{-1}$ | [CO] In % | C % | $C_{eq}$ % | Rate mol * $kg^{-1}$ * $h^{-1}$ |
|---|---|---|---|---|---|---|---|---|---|---|---|---|---|
| 3 | A | 1.76 | 0.70 | 6.0 | 4.0 | 1.8 | 5.0 | 84 | 16.8 | 9.8 | 60 | 82 | 44.1 |
| 4 | B | 0.88 | 0.70 | 6.0 | 4.0 | 1.8 | 4.8 | 84 | 17.5 | 9.7 | 52 | 82 | 39.4 |
| 5 | C | 3.95 | 0.70 | 6.0 | 4.0 | 1.9 | 4.9 | 84 | 17.1 | 9.7 | 55 | 82 | 40.8 |
| 6 | D | 2.77 | 0.67 | 5.9 | 3.1 | 1.5 | 4.9 | 84 | 17.1 | 9.6 | 63 | 82 | 46.7 |
| 7 | E | Na | 0.60 | 6.0 | 4.0 | 1.8 | 5.2 | 84 | 16.2 | 9.5 | 40 | 82 | 27.4 |

TABLE 2-continued

Activities of catalysts of the invention and of some comparative catalysts. P = 2.3 MPa, T = 380° C., S/G = 0.59

| Ex. | Cat | [K] % | Zn/Al | D Mm | H Mm | d g * cm$^{-3}$ | $M_{cat}$ g | F Nl * h$^{-1}$ | GHSV Nl * g$^{-1}$ * h$^{-1}$ | [CO] In % | C % | $C_{eq}$ % | Rate mol * kg$^{-1}$ * h$^{-1}$ |
|---|---|---|---|---|---|---|---|---|---|---|---|---|---|
| 8 | C1 | 1.02 0.00 | 0.57 | 4.5 | 3.7 | 1.8 | 35.9 | 99 | 2.8 | 9.4 | 64 | 78 | 7.4 |
| 9 | C2 | 5.34 | 0.00 | ** | ** | ** | 25.0 | 99 | 4.0 | 9.4 | 31 | 78 | 5.1 |
| 10 | C3 | — | — | 6.0 | 6.0 | 1.9 | 5.0 | 84 | 16.8 | 9.7 | 52 | 82 | 37.8 |

Examples 3-10

The catalysts of the present invention A, B, C, D and E are all active for the water gas shift reaction under the conditions specified in Table 2 as shown by Examples 3-7. Catalysts A, B, C and D differ mostly in their content of potassium. The most active of these catalysts at the specified conditions is catalyst D which contains 2.77% K. Catalyst A and B have smaller K-contents, namely 1.76% and 0.88%, respectively, while catalyst C has a larger K-content, namely 3.95%. Therefore the most preferable K-content is within the range 0.88%-3.95%, preferably in the range 1-3%. Sodium may be used instead of potassium as shown in Example 7. Surprisingly, potassium is a considerably more effective promoter than sodium. The surprising effect of combining the ZnO/ZnAl$_2$O$_4$ system with a K-promoter is demonstrated by comparing the high Rates (39.4-46.7 mol/kg/h) obtained with the catalysts of the present invention in Examples 3-6 to the comparative catalysts in Examples 8 and 9. The first of these, C1, is an unpromoted ZnO/ZnAl$_2$O$_4$ catalyst. This catalyst was tested at low GHSV in order to reach a significant conversion. The activity is considerably lower (Rate=7.4 mol/kg/h) than that of any of the K-promoted catalysts. Likewise, the activity of a K-promoted Al$_2$O$_3$ displays a very low activity, namely Rate=5.1 mol/kg/h. Example 10 demonstrates that the activity of a typical Cu—Cr—Fe catalyst, under conditions similar to those applied in Examples 3-7, is Rate=37.8 mol/kg/h. The example thus shows that the catalysts of the present invention actually may be more active than the Cu—Cr—Fe catalyst under industrially relevant conditions.

Examples 11-18

The Zn/Al ratio is of importance to the catalyst activity. The catalysts F and G of the present invention differ mainly by having a Zn/Al molar ratio of 0.69 and 0.59, respectively. The more zinc-rich Catalyst F has the highest activity of the two as seen by comparing Examples 11 and 12. Thus, a Zn/Al ratio of 0.69 is preferred to a Zn/Al ratio of 0.59.

The effect of the identity of the alkali metal promoter was also investigated further. It has already been mentioned how K-promotion increases the activity of the ZnO/ZnAl2O4 catalysts and also that K is a stronger promoter than Na. A similar effect as with K is observed with Cs as promoter as shown by Example 13. Catalyst H contains 7.2% Cs which corresponds to 2.1% Cs on a molar basis. It is seen that the activity of Catalyst H is comparable to that of Catalyst F, which is promoted with potassium. Whereas K and Cs are strong promoters and Na is an intermediate promoter, it is surprising to find that Li is seemingly without effect. This is demonstrated by the comparative catalysts C4 and C5 in Examples 14 and 15. Actually, the activity of these two catalysts is comparable to that of the unpromoted comparative catalysts C6 and C7. The Rate of the four comparative catalysts is in the range 18.3-22.4 mol/kg/h, while that of the catalysts of the present invention F, G and H is in the range 67.2-79.5 mol/kg/h under the conditions specified in Table 3.

Example 18 demonstrates the activity of the Cu—Cr—Fe catalyst C3 under the conditions specified. The reaction rate was found to be Rate=66.2 mol/kg/h in consistency with the results discussed in Examples 3-10.

TABLE 3

Effect of various alkali metals, varying Zn/Al ratio and Cu compared to Cu—Cr—Fe catalyst. P = 2.5 MPa, T = 391° C., S/G = 0.51.

| Ex. | Cat | Comments | [K] % | Zn/Al | D mm | H Mm | d g * cm$^{-3}$ | $M_{cat}$ g | F Nl * h$^{-1}$ | GHSV Nl * g$^{-1}$ * h$^{-1}$ | [CO] In % | C % | $C_{eq}$ % | Rate mol * kg$^{-1}$ * h$^{-1}$ |
|---|---|---|---|---|---|---|---|---|---|---|---|---|---|---|
| 11 | F | | 1.06 | 0.69 | 4.5 | 4.2 | 1.7 | 1.13 | 75 | 66.4 | 9.9 | 27 | 77 | 79.2 |
| 12 | G | | 1.17 | 0.59 | 4.5 | 4.5 | 2.1 | 1.39 | 74 | 50.7 | 10.2 | 28 | 76 | 67.8 |
| 13 | H | 7.2% Cs | — | 0.70 | 4.5 | 4.2 | 1.8 | 1.19 | 75 | 63.0 | 10.1 | 28 | 76 | 79.5 |
| 14 | C4 | 0.20% Li | — | 0.70 | 4.5 | 4.2 | 1.7 | 1.10 | 76 | 69.1 | 9.9 | 6 | 77 | 18.3 |
| 15 | C5 | 0.85% Li | — | 0.70 | 4.5 | 4.2 | 1.8 | 1.10 | 76 | 69.1 | 10.0 | 6 | 77 | 18.3 |
| 16 | C6 | | — | 0.52 | 4.5 | 4.5 | 1.8 | 1.30 | 75 | 57.7 | 10.3 | 7 | 77 | 18.6 |
| 17 | C7 | | — | 0.70 | 4.5 | 4.2 | 1.7 | 1.10 | 76 | 69.1 | 10.4 | 7 | 77 | 22.4 |
| 18 | C3 | Cu—Cr—Fe | — | — | 6.0 | 6.0 | 1.9 | 3.2 | 169 | 52.8 | 10.4 | 27 | 76 | 66.2 |

TABLE 4

Comparison of Zn—Al oxide catalyst to Mg—Al oxide catalysts.
Granules, P = 0.1 MPa, T = 380° C., S/G = 0.50

| Ex. | Cat | Comments | [K] % | Zn/Al | $M_{cat}$ g | F Nl * $h^{-1}$ | S/G | GHSV Nl * $g^{-1}$ * $h^{-1}$ | [CO] In % | C % | $C_{eq}$ % | Rate mol * $kg^{-1}$ * $h^{-1}$ |
|---|---|---|---|---|---|---|---|---|---|---|---|---|
| 19 | A | | 1.76 | 0.70 | 0.20 | 5.3 | 0.50 | 26.5 | 9.1 | 36 | 76 | 39.0 |
| 20 | C9 | MgO/Al2O3 | — | — | 0.20 | 5.3 | 0.50 | 26.5 | 9.7 | 0 | 76 | 0.3 |
| 21 | C10 | MgO/Al2O3 | 1.51 | — | 0.20 | 7.3 | 0.50 | 36.5 | 9.7 | 1 | 76 | 1.0 |
| 22 | C11 | MgO/Al2O3 | — | — | 0.20 | 5.9 | 0.50 | 29.5 | 9.7 | 0 | 76 | 0.0 |
| 23 | C12 | MgO/Al2O3 | 1.55 | — | 0.20 | 6.2 | 0.50 | 31.0 | 9.7 | 1 | 76 | 0.9 |

Examples 19-23

The present invention claims the combination of the ZnO/ZnAl$_2$O$_4$ system with an alkali metal promoter. It is well known that Mg (II) and Zn (II) resemble one another in their chemical and physical behaviour: both form basic oxides which are able to form stable spinel phases with alumina. It is therefore surprising to see that there is almost no activity of either promoted or unpromoted MgO/MgAl$_2$O$_4$ catalysts. These catalysts were tested at low pressure and therefore a similar example with catalyst A of the present invention was carried out. It is seen from Table 4 that while catalyst A has significant activity, expressed as Rate=39.0 mol/kg/h, the magnesia-based catalysts C9, C10, C11 and C12 with varying Mg/Al ratio and varying K-content all were found to have reaction rates of 1.0 mol/kg/h or less.

Example 24

Test of Catalyst G of the present invention at high pressure and low S/G ratio. This example serves to demonstrate that high activity for the water gas shift reaction is achieved also under the present set of operating conditions and the selectivity for the water gas shift reaction remains high. Analysis of the exit gas showed 660 ppm CH$_3$OH and 35 ppm CH$_4$ in the gas phase after contact with the catalyst. The rate is low compared to previous examples due to the low steam content of the gas.

TABLE 5

Catalyst G tested at high pressure and low S/G. P = 6.5 MPa, T = 394° C., S/G = 0.14

| Ex. | Cat | D mm | H mm | d g * $cm^{-3}$ | $M_{cat}$ g | F Nl * $h^{-1}$ | GHSV Nl * $g^{-1}$ * $h^{-1}$ | [CO] In % | C % | $C_{eq}$ % | Rate mol * $kg^{-1}$ * $h^{-1}$ |
|---|---|---|---|---|---|---|---|---|---|---|---|
| 24 | G | 4.5 | 4.5 | 2.1 | 50.0 | 684 | 13.7 | 13.0 | 28 | 36 | 22.2 |

Examples 25-29

These examples serve to demonstrate the behaviour of a typical catalyst of the present invention towards exposure to chlorine and sulphur. Chlorine and sulphur are typical catalyst poisons and most catalysts tend to become less active on contact with compounds of these elements. Example 25 was carried out as described in example 3 with the difference that ammonium chloride was added to the feed water so as to create a concentration of 0.25 ppm chlorine in the gas phase. The exposure to the chlorine containing gas lasted for 45 hours during which the conversion (C) decreased slightly, from 69% to 68%. Example 26 was carried out likewise but with 25 ppm Cl in the gas. In this case the exposure lasted 73 hours during which the conversion decreased considerably, namely from 71% to 43%. After test the catalyst was analyzed and found to contain 0.62% chlorine in average over the entire catalyst bed. In current industrial practice the gas will rarely contain chlorine above the ppb level if there is any at all. It can be concluded that the catalyst has a high capacity for chlorine and a high tolerance towards this poison. Data are listed in Table 6. Example 27 serves to demonstrate the tolerance of catalyst A towards sulfur in low concentrations. H$_2$S in low concentrations was generated by loading alternately catalyst pellets and pellets of ZnS thus generating H$_2$S by the reaction ZnS+H$_2$O (g)=ZnO+H$_2$S (g). At equilibrium this reaction generates 0.4 ppm H$_2$S which concentration represents an upper limit for the true H$_2$S concentration. The experiment was carried out by loading the catalyst pellets and pellets of ZnS alternately one by one. The test had duration of 144 hours during which the CO-conversion (C) was constant at 49%. After the test the catalyst was analyzed and found to contain 260 ppm S.

In example 28 a fresh sample of catalyst A was loaded. The conversion was measured to be 47%. The catalyst was then exposed to 10% H$_2$S in hydrogen for 4 hours after which the catalyst was unloaded and found to contain 10.7% sulphur. The catalyst was reloaded into the reactor and the test was resumed. Conversion was found to be 21% thus less than half the original conversion. After 30 hours at 380° C. the conversion was observed to increase to 22.5%. The temperature was then raised to 480° C. for 30 hours and decreased again to 380° C. for another 30 hours. This temperature cycle was repeated a number of times and each time the conversion was observed to have increased. After 12 cycles (750 hours) the conversion was found to have reached the original value of 47%. The catalyst was unloaded and analyzed for sulphur. Surprisingly, the catalyst contained 5.4% S which means that this partly sulfided catalyst has the same activity as the original, sulfur free catalyst. Data are listed in Table 6.

TABLE 6

Catalyst A sensitivity towards poisons. P = 2.3 MPa, T = 380° C.,
S/G = 0.60. Catalyst shaped as cylindrical pellets, 6.0 mm × 4.0 mm, d = 1.8 g/cm³

| Ex. | Cat | [C1] in gas ppm | [C1] in cat. % | [S] in gas ppm | [S] in cat. % | Time h | $M_{cat}$ g | F Nl * h⁻¹ | GHSV Nl * g⁻¹ * h⁻¹ | [CO] In % | C start % | C end % |
|---|---|---|---|---|---|---|---|---|---|---|---|---|
| 25 | A | 0.25 | NM* | — | — | 45 | 10.0 | 84 | 8.4 | 9.6 | 69 | 68 |
| 26 | A | 25.0 | 0.62 | — | — | 73 | 10.1 | 84 | 8.3 | 10.2 | 71 | 43 |
| 27 | A | — | — | 0.4 | 0.026 | 144 | 5.1 | 84 | 16.5 | 10.3 | 49 | 49 |
| 28 | A | — | — | 10⁵ | 10.7 | 85 | 5.1 | 84 | 16.5 | 9.6 | 47 | 21 |
| 29 | Ex 28 | — | — | — | 5.4 | 750** | 4.8 | 84 | 17.5 | 9.3 | 21 | 47 |

*NM = Not Measured
**temperature cycles, see text.

Examples 30-31

Example 30 demonstrates the long-term stability of a catalyst according to the present invention. Tests were carried out as integral experiments in a semi-adiabatic reactor. The catalyst (39.9 g catalyst I) was loaded in a copper-lined tubular reactor of inner diameter=19 mm. The reactor was heated by three external electrical heaters. Internal thermoelements allowed for obtaining a temperature profile down the catalyst zone. In each experiment the exit temperature was fixed at approximately 397° C., while the inlet temperature was adjusted by means of the external heater duty. An almost linear temperature profile was obtained. The total gas flow was 796 Nl/h rendering an intermediate conversion at the conditions of operation with equilibrium conversion equal to 78%. Example 31 is a comparative example with catalyst C8 showing that promotion by copper does not last long and therefore that this relatively costly element may safely be excluded. These integral experiments were run for more than 1300 hours. Table 7 lists the activities of catalysts I and C8 as function of time-on-stream (TOS).

TABLE 7

Integral experiments. P = 2.35 MPa, T(in) = 362 ± 6° C., T(ex) = 397 ± 3° C., S/G = 0.60

| Ex | Cat | Cu % | K % | Zn/Al | D mm | H mm | d g/cm³ | $M_{cat}$ g | [CO] Inlet % | TOS h | C % | $C_{eq}$ % |
|---|---|---|---|---|---|---|---|---|---|---|---|---|
| 30 | I | — | 1.19 | 0.58 | 5.7 | 5.7 | 1.8 | 39.9 | 9.4 | 552 | 37.4 | 78 |
| " | " | " | " | " | " | " | " | " | " | 672 | 37.2 | " |
| " | " | " | " | " | " | " | " | " | " | 1028 | 38.4 | " |
| " | " | " | " | " | " | " | " | " | " | 1321 | 38.5 | " |
| " | " | " | " | " | " | " | " | " | " | 1392 | 38.6 | " |
| 31 | C8 | 1.83 | 1.73 | 0.57 | 5.9 | 6.0 | 1.8 | 40.1 | 9.4 | 24 | 47.9 | 78 |
| " | " | " | " | " | " | " | " | " | " | 402 | 38.6 | " |
| " | " | " | " | " | " | " | " | " | " | 523 | 38.3 | " |
| " | " | " | " | " | " | " | " | " | " | 667 | 38.0 | " |
| " | " | " | " | " | " | " | " | " | " | 1340 | 38.2 | " |

Example

Specific Net Energy Consumption (SNEC)

This example presents a comparison of energy consumption when operating a process for ammonia or hydrogen production at the conventional S/C ratio of 2.75 with respect to a low S/C ratio of 1.8. The results of Table 8 show that by the invention it is now possible to significantly reduce the S/C ratio in the reforming section, thereby increasing the energy efficiency (lower SNEC values) as well as reducing the size of plant equipment significantly.

TABLE 8

Specific net energy consumption at different S/C ratios

| | | HTS: S/C = 1.8 | HTS: S/C = 2.75 |
|---|---|---|---|
| PFD calc. #: | | 1075994 | 944418 |
| Refrad calc. # | | | |
| Capacity | Nm3/h | 25000 | 25000 |
| S/C | | 1.80 | 2.75 |
| Teq | ° C. | 910.00 | 850.00 |
| P inlet reformer | bar | 33.90 | 33.20 |
| Dp Catbed | bar | | |
| Feed | Nm3/h | 10697 | 10253 |
| Pressure, | bar | 44.90 | 44.00 |
| Temperature, | ° C. | 10.00 | 10.00 |
| LHV | kcal/Nm3 | 9016 | 9016 |
| NEC | Gcal/h | 96.44 | 92.44 |
| SNEC | Gcal/1000 Nm3 H2 | 3.86 | 3.70 |
| Fuel | Nm3/h | 959 | 1682 |
| Pressure, | bar | 0.30 | 0.30 |
| Temperature, | ° C. | 40.00 | 40.00 |
| LHV | kcal/Nm3 | 9016 | 9016 |
| NEC | Gcal/h | 8.65 | 15.16 |

TABLE 8-continued

Specific net energy consumption at different S/C ratios

| | | HTS: S/C = 1.8 | HTS: S/C = 2.75 |
|---|---|---|---|
| SNEC | Gcal/1000 Nm3 H2 | 0.35 | 0.61 |
| SNEC Feed + Fuel | Gcal/1000 Nm3 H2 | 4.20 | 4.30 |
| Steam export | kg/h | 35826 | 34647 |
| Pressure | bar | 79.5 | 79.5 |
| Temperature | ° C. | 485 | 485 |
| Heat content | kcal/kg | 803.5 | 803.5 |
| NEC | Gcal/h | 28.79 | 27.84 |

TABLE 8-continued

Specific net energy consumption at different S/C ratios

| | | HTS: S/C = 1.8 | HTS: S/C = 2.75 |
|---|---|---|---|
| SNEC | Gcal/1000 Nm3 H2 | 1.15 | 1.11 |
| SNEC feed + fuel-steam | Gcal/1000 Nm3 H2 | 3.05 | 3.19 |

What is claimed is:

1. A process for enriching a synthesis gas mixture in hydrogen by contacting said synthesis gas mixture with a catalyst consisting in its active form of a mixture of zinc alumina spinel and zinc oxide in combination with an alkali metal selected from the group consisting of Na, K, Rb, Cs and mixtures thereof, said catalyst having a Zn/Al molar ratio in the range 0.5 to 1.0 and a content of alkali metal in the range 0.4 to 8.0 wt % based on the weight of oxidized catalyst.

2. A process for enriching a synthesis gas mixture in carbon monoxide by contacting said synthesis gas mixture with a catalyst consisting in its active form of a mixture of zinc alumina spinel and zinc oxide in combination with an alkali metal selected from the group consisting of Na, K, Rb, Cs and mixtures thereof, said catalyst having a Zn/Al molar ratio in the range 0.5 to 1.0 and a content of alkali metal in the range 0.4 to 8.0 wt % based on the weight of oxidized catalyst.

3. Process according to claim 1, wherein said synthesis gas mixture has S/G ratio of 0.05 to 0.9, a temperature of 300 to 400° C. and the reactor operates at a gas pressure in the range 2.3 to 6.5 MPa.

* * * * *